Aug. 1, 1967  R. E. SMITH  3,333,411
APPARATUS FOR FORMING A HOG RING
Filed Aug. 7, 1964  2 Sheets-Sheet 1
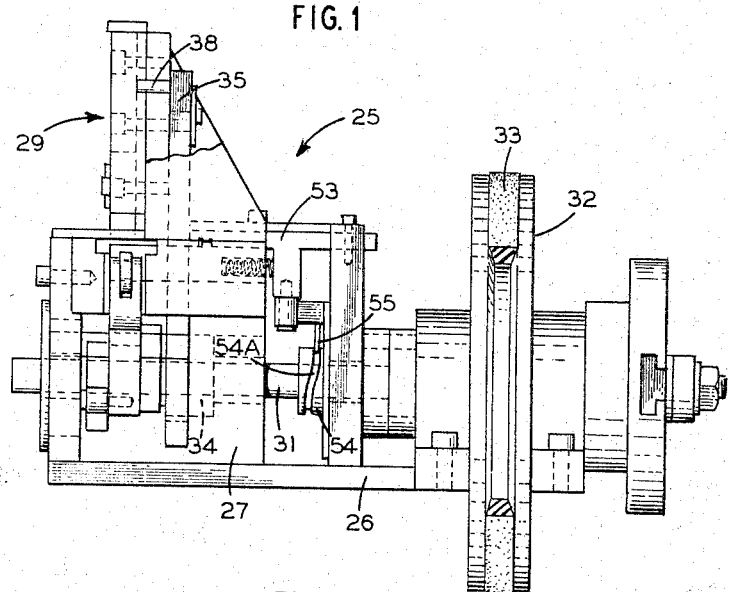
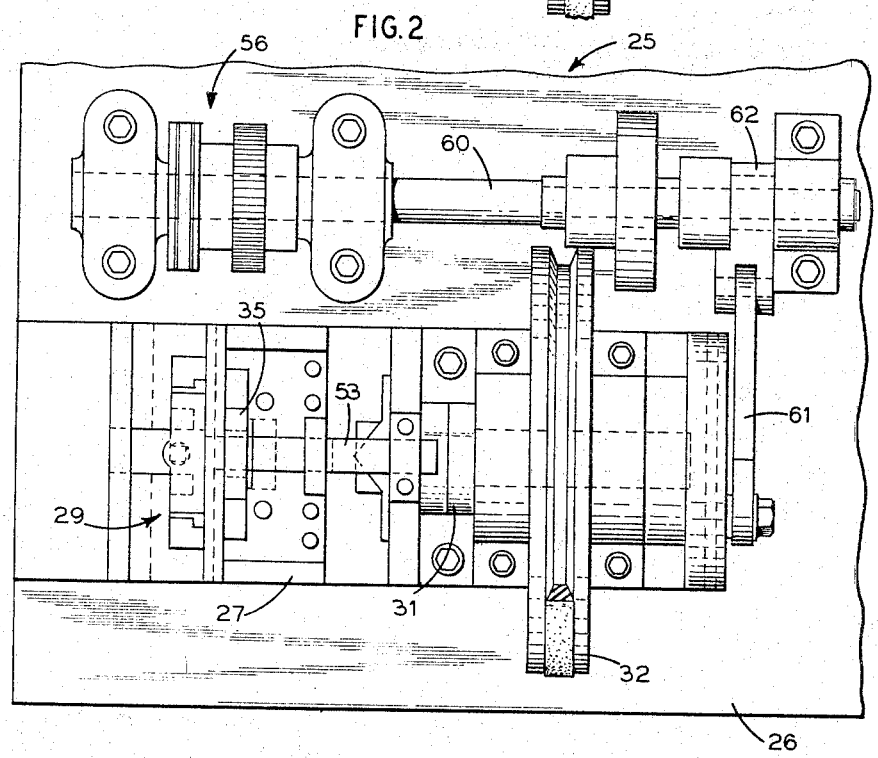
INVENTOR.
Randall E. Smith
BY
*Irving Seidman*
ATTORNEY Aug. 1, 1967 R. E. SMITH 3,333,411
APPARATUS FOR FORMING A HOG RING
Filed Aug. 7, 1964 2 Sheets-Sheet 2

INVENTOR.
Randall E. Smith
BY
*Irving Seidman*
ATTORNEY

United States Patent Office 3,333,411
Patented Aug. 1, 1967

3,333,411
APPARATUS FOR FORMING A HOG RING
Randall E. Smith, Upper Saddle River, N.J., assignor to Republic Fastener Products Corp., Saddle Brook, N.J., a corporation
Filed Aug. 7, 1964, Ser. No. 388,158
7 Claims. (Cl. 59—71)

ABSTRACT OF THE DISCLOSURE

This invention relates to an apparatus for constructing hog rings from a continuous strand of wire stock material and it comprises a reciprocating cutter assembly and a cooperating anvil with cooperating feed rollers intermittently feeding wire stock material to the cutter assembly. The cutter severs the end portion of the wire stock material along an oblique line to define complementary opposed pointed end portions between the severed end of the wire material and the continuous wire strand. The severed portion is then secured to the anvil as opposed kickers are actuated to bend the opposed end portions of the severed length of wire material downwardly, and to impart an opposed twist to the bent end portion of the severed length.

---

This invention relates in general to an apparatus for making hog rings, and more specifically to an apparatus for automatically forming hog rings from a continuous strand of wire stock material.

An object of this invention is to provide an apparatus for automatically forming a hog ring from a continuous strip of wire stock material and which is relatively simple in construction and positive in operation.

Another object is to provide an apparatus for automatically forming a hog ring from continuous wire stock material that requires a minimum of human attention.

Still another object is to provide an automatic apparatus for making hog rings in which the rate of feed of the wire stock is mechanically timed to the operation of severing and forming of the same from the wire stock.

Still another object is to provide an apparatus for automatically forming and shaping hog rings so that when bent, the respective end portions of the hog ring will close to overlap to define a positive closing action.

Still another object is to porvide an apparatus for making a hog ring in which the feed of the stock material can be varied.

The foregoing objects, and other features and advantages are attained by an apparatus comprising essentially of a reciprocating cutter assembly and a cooperating anvil or forming assembly. Means including a power driven crank shaft are provided to effect reciprocation of the cutting assembly relative to the anvil assembly. Operatively associated with the drive means are means to effect intermittent feeding or advancing of wire stock material to a position between the cutter assembly and the cooperating anvil assembly in timed relationship to the operation of the cutter assembly.

In accordance with this invention, the cutter assembly includes a reciprocating ram which carries therewith a pair of spaced apart cutting punches. Cooperatively associated with one of the cutting punches is a die member. The arrangement therebetween is such that upon operation, the cutting punch and associated die will sever the end portion of the wire stock from the supply of the same at an oblique angle to define a sharp point at the respective end of the severed wire. Cooperatively associated with the cutting punches and disposed therebetween there is provided a spring biased hold-down means for holding the severed end portion or link of wire stock in position on the anvil means. Opposed kicker means are cooperatively associated with the anvil means to effect the formation of the severed link of wire stock into an open end hog ring. The respective kicker means are constructed and arranged to close onto the anvil to shape the severed link thereto and in doing so impart a slight twist to the opposed ends of the severed link. In accordance with this invention, the crank shaft of the driving means is specifically constructed to mechanically time the sequence of successively advancing or feeding the stock material, severing, and forming the severed end of the wire stock about the form of the anvil.

Operatively associated with the anvil means is an ejector. Essentially the ejector comprises a reciprocating member arranged to slide the hog ring off the end of the anvil upon the formation of the same. Means in the form of a cooperating cam follower connected to the end of the ejector and aranged to ride in the groove of the cam journalled on the crank shaft is provided to time the operation of the ejector means to the respective operation of feeding, severing, and forming of the wire stock.

A feature of this invention resides in the positive manner in which the cutting, forming and ejecting of the hog ring are mechanically timed.

Another feature of this invention resides in the provision that the opposed kicker means are constructed to impart an opposite twist to the respective ends of the severed link.

Another feature of this invention resides in the provision that the links from which the hog rings are formed are severed from a continuous strand of wire material.

Other features and advantages will become more readily apparent when considered in view of the drawings and description in which, FIGURE 1 is a side elevation view of the basic machine components required for carrying out the instant invention.

FIGURE 2 is a plan view of FIG. 1.

Figure 3:
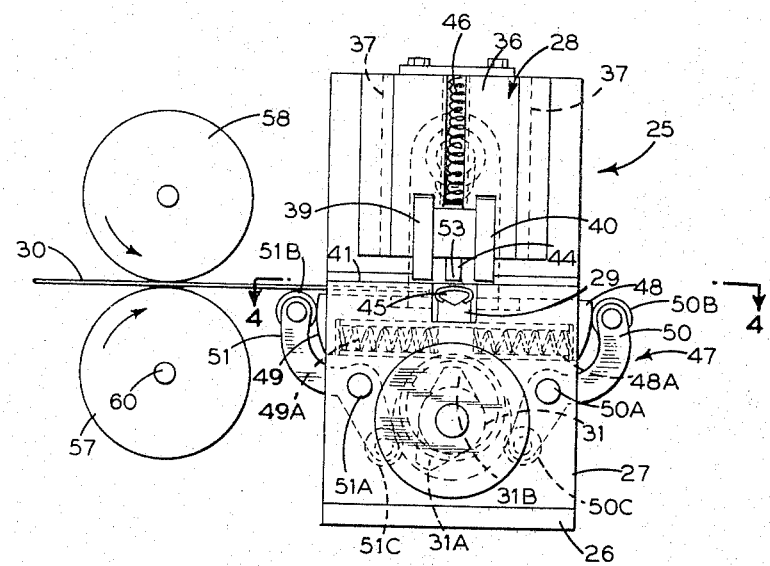
FIGURE 3 is a left end elevation view of FIG. 1.

Referring to the drawings, there is illustrated in FIGS. 1 to 3 the basic machine components required for automatically forming hog rings from a continuous strand of wire stock material. A hog ring as herein termed is defined as any open end or C-shaped ring or clip. Generally, such rings or clips are provided with sharp points on the ends thereof. They are usually formed of a suitable wire stock material and are used as fastening means for securing, as for example, seat covers to upholstered seats or chairs. To function as a fastener, a plier type tool is usually employed to press closed the open ends of the ring or clip.

Figure 6:
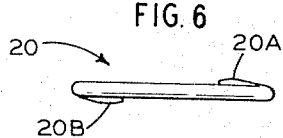
FIGURE 6 is a plan view of the hog ring of FIG. 5.
Figure 5:
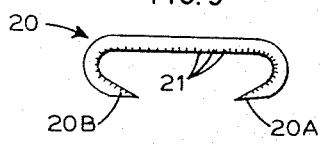
FIGURE 5 is a detail view of the finished hog ring shape of the instant invention.
Figure 7:
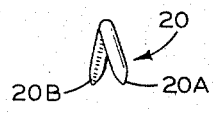
FIGURE 7 is an end view of the hog ring of FIG. 5.
Figure 8:
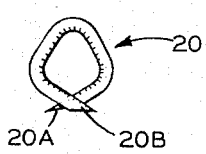
FIGURE 8 is a detail view of the hog ring shown in its closed or operating position.

FIGURES 5 to 7 illustrate a typical hog ring 20 which is formed by the instant apparatus. It is susbtantially C-shaped having inturned end portions 20A, 20B in the normal open position thereof. The respective end portions 20A, 20B are cut at an oblique angle to define a sharp point thereat. The under surface of the wire stock defining the hog ring has formed therein a plurality of transversely extending score lines 21 which will facilitate bending. These score lines 21 are formed on the stock during the feed of the same to the forming apparatus 25, as will be hereinafter described. The opposed ends 20A, 20B of the hog ring 20 are oppositely twisted slightly as noted in FIGS. 6 and 7. With this construction, the opposed ends 20A, 20B of the hog ring will cross as they close in a manner so that the respective ends thereof are disposed in contiguous back to back relationship to define a positive closed loop as shown in FIG. 8.

In accordance with this invention, the hog ring, described, is automatically formed by the apparatus 25 depicted in FIGS. 1 to 4. The apparatus comprises essentially of a suitable frame structure 26 on which there is supported a mount 27 on which there is mounted the cutter assembly 28 and the cooperating anvil assembly 29 necessary for cutting and shaping the hog ring 20 from a strand 30 of wire stock material. Supported on the frame 26 and rotatably journalled within the mount 27 is the main drive or crank 31 of the apparatus. A flywheel 32 is connected to one end of the drive shaft 31, and it in turn is connected in driving relationship with a motor means (not shown) through a flexible belt drive 33 connected in a manner well known to those skilled in the art.

An eccentric cam 34 is disposed intermediate the ends of the drive shaft 31. Journalled about the eccentric cam 34 is a pitman or connecting rod 35 which extends upwardly through the mount. Accordingly, as the drive shaft 31 is rotated, rotation of the drive shaft 31 will transmit a reciprocating movement to the pitman or connecting rod 35 journalled about the eccentric portion of the drive shaft.

Figure 4:
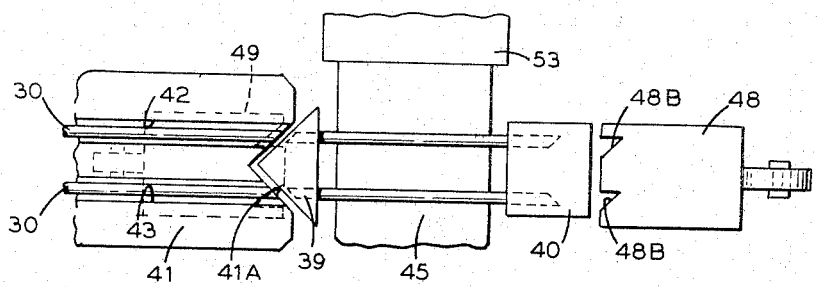
FIGURE 4 is an enlarged fragmentary plan view taken along line 4—4 of FIG. 3.

Attached to the pitman or connecting rod 35 and arranged to reciprocate therewith is the cutting assembly 28 of the instant invention. The cutting assembly 28 comprises a ram 36 which is slidably mounted in a suitable guide ways 37 formed in the end of the mount 27. A forwardly extending pin 38 connected to the upper end of the pitman or connecting rod 35 forms the connection between the ram 36 and the connecting rod 35. Fixed to the ram 36 and arranged to be carried therewith are a pair of spaced cutting punches 39 and 40. One of the cutting punches 39 is substantially triangular in cross section and it is cooperatively associated with a cutting die 41 which has formed in the end thereof a V-shaped notch 41A arranged to accommodate the apex portion of the cutting punch 39 as the ram 36 is lowered. In the illustrated embodiment, as shown in FIG. 4, the cutting die 41 is provided with a pair of parallel grooves 42, 43 which respectively receives a strand of wire stock material from whence the hog rings are formed. Thus in the illustrated embodiment a pair of hog rings are simultaneously formed on each operation of the apparatus.

Interposed between the respective cutting punches 39, 40 is a pressure pin 44 which functions as a hold-down for maintaining the severed end portions or links of the wire stock material in position on the anvil assembly 29 disposed immediately therebelow.

As shown, the anvil assembly 29 comprises a bar 45 of hardened metallic substance which is provided with a cross sectional shape similar to that which the finished hog ring is to assume. In the illustrated embodiment, the upper surface of the anvil bar 45 is formed with a slight curvature as the sides of the anvil bar 45 are turned inwardly.

A compression spring 46 is cooperatively associated with the hold-down pin 44 for maintaining the same under spring tension. With the construction thus far described, it will be apparent that whenever the main drive shaft 31 is rotated, as when the motor means is actuated, the cutting assembly 28 including the ram 36 and the cutting punches 39, 40 fixed thereto are reciprocated in an up and down motion. In doing so the cutting punch 39 severes the wire stock and the hold-down 44 grips the severed link to the anvil bar 45.

Cooperatively associated with the anvil assembly 29 are a pair of opposed kicker means 47. As shown, each of the opposed kicker means 47 comprises a kicker 48, 49 slidably mounted on opposite sides of the anvil 45 for movement toward and away from the anvil 45. A compression spring 48A, 49A is utilized to normally bias the respective kickers 48, 49 away from the anvil assembly 29. Pivotally mounted to the mount 27 are a pair of kicker arms 50, 51 each of which is cooperatively associated with one of the respective kickers 48, 49. As shown, each of the respective kicker arms 50, 51 are pivotally connected to the mount 27 about a pivot 50A, 51A intermediate the ends thereof. Accordingly, one end of the respective kicker arms 50, 51 is provided with a cam roller 50B, 51B arranged in rolling engagement with the outer end portion of its respective kickers 48, 49. The other end portion of the respective kicker arms 50, 51 are provided with an eccentric cam rollers 50C, 51C journalled thereto.

To activate the kicker arms 50, 51 so as to reciprocate the associated kickers 48, 49, the crank shaft 31 is provided with a pair of angularly disposed cam lobes 31A, 31B. The arrangement is such that as the drive shaft 31 is rotated, the lobes 31A, 31B are so disposed so that they will cam the respective lower ends of the kicker arms 50, 51 outwardly thereby pivoting the upper arm portions thereof inwardly. To overcome the force of the kicker springs 48A, 49A causing the opposed kickers 48, 49 to be moved inwardly toward the anvil. As a result, the opposed kickers will engage the bent ends of the severed links and form the same to the sides of the anvil bar 45.

Cooperatively associated with the anvil is an ejector means for ejecting the hog rings off the end of the anvil after they have been formed. As shown, the ejector comprises a sliding or reciprocating bar 53 slidably mounted on the anvil 45. To effect the reciprocation of the ejector 53 in timed sequence to the formation of the hog ring, a grooved cam 54 is connected to the drive shaft 31 to rotate therewith. As shown in FIG. 1, the groove 54A of the cam 54 is arranged to receive a follower element 55 which is dependently connected to the ejector 53. The shape of the cam groove 54A is such that rotation of the crank shaft 31 will impart a reciprocating movement to the ejector 53.

Means 56 are provided whereby the feeding wire stock material is timed to the cutting and forming operation of the hog ring links. In accordance with this invention, the feeding of the stock material between the cutter assembly and the associated anvil is attained by a pair of feed rollers 57, 58 which cause the wire stock material to be advanced to the cutting station of the apparatus. As shown, the feed rollers include a drive roller 57 and a cooperating driven roller 58, the latter being disposed in driving relationship to the former. The drive feed roller 51 is journalled to the feed shaft 60 which in turn is connected into driving relationship with the flywheel 32 through the intermediary of a connecting link or turn buckle 61 which is adjustable to vary the throw or stroke thereof. The free end of the turn buckle 61 connects to a single acting clutch assembly 62 operatively associated with the feed drive shaft 60 to effect intermittant driving of the feed rollers 57, 58 so that the continuous wire stock material is intermittently advanced between the cutter assembly and the anvil assembly of the apparatus. The entire operational sequences are timed so that the feeding, the severing, the forming and the ejecting of the finished hog rings are successively performed in rapid fire order.

In order to facilitate bending of the hog ring, the feed roller 57 is provided with a scored groove whereby the pressure exerted between the respective feed rollers 57, 58 onto the wire material passing therebetween impresses the scoring of the feed roller 57 onto the lower surface of the wire stock to produce a series of transversely extending score lines 21 as depicted in FIG. 5.

Dekinking means (not shown) may be provided downstream of the feed rollers to insure trouble free operation. The operation of the apparatus is as follows:

The wire stock material taken from a suitable supply roll of wire material is first fed between the feed rollers 57, 58. The driving feed roller 57 is provided with two circumscribing grooves, each accommodating one strand of the wire material. The arrangement is such that two strands of wire material are thus simultaneously fed to the cutting station of the apparatus to enable the hog rings to be formed in pairs and thereby increase the output of a given machine. While the illustrated embodiment discloses the simultaneous feeding of two wire strands, it will be readily apparent that more than two strands may be simultaneously fed in the event the output of a given machine is desired to be increased accordingly. With the strands of wire material satisfactorily disposed between the feed rollers, the machine is energized by starting the motor (not shown) for rotating the flywheel. Upon actuation of the motor, the flywheel is rotated and it in turn effects rotation of the main drive shaft 31. Cooperatively associated with the flywheel 32 is the connecting link 61 which through the clutch 62 effects intermittent actuation of the feed roller drive shaft 60 in time sequence with the operation of the cutter assembly. Accordingly, the feed rollers 57, 58 advance or feeds the end of the wire stock between the cutter assembly and the anvil. The cutter assembly 28 and ram is then moved downwardly so that the cutting punch 39 carried thereby will sever the respective ends of the wire 30. Because of the specific construction of the punch die 41, it will be noted as shown in FIG. 4, that the respective ends of the wire 30 are severed from the main strand thereof along an oblique line to thereby define complementary opposed pointed portions between the severed end and the supply strand.

As the respective end portions are severed, the holddown member 44 of the cutter assembly positively holds the severed links in position on the anvil 45. At this instance, the paired lobes 31A, 31B of the cam shaft 31 come around to engage the eccentric cam followers 50C, 51C of the opposed kicker arms 50, 51 to displace the same laterally. As this occurs, the upper ends of the kicker arms 50, 51 are moved inwardly toward one another thereby displacing the respective kickers 48, 49 associated therewith inwardly to close the opposed ends of the link onto the sides of the anvil bar 45. In accordance with this invention, the ends of the respective kickers are provided with notched portions 48B, 49B for receiving the opposed ends 20A, 20B of the link 20. The respective notch portions 48B, 49B are disposed to impart to the bent ends of the hog ring a slight opposite twist during the forming of the same. This provides a hog ring 20 of the shape and construction substantially as described and illustrated with reference to FIGS. 5 and 7. As the lobes 31A, 31B are rotated beyond the eccentric cam followers 50C, 51C, the kicker arms are returned to their respective inoperative position under the action of the compression spring 48A, 49A acting thereon. At this point in the operation, the ejector 53 is moved forwardly due to the timing thereof by means of the cam groove 54 and cam follower 55 to thereby eject the formed hog ring off the end of the anvil. Upon retraction of the ejector means, the feed roller 57, 58 are again actuated to advance the end portion of the respective wire strands into position over the anvil and under the cutter assembly at which time the cycle of operation is repeated.

While the instant invention has been described with reference to a particular embodiment thereof, it will be readily apparent and appreciated that variations and modifications thereof may be made without departing from the spirit or scope of the instant invention.

What is claimed is:

1. An apparatus for automatically forming a hog ring from a continuous strand of wire stock material comprising,
    (a) a frame having a cutting station thereon,
    (b) a drive shaft rotatably journalled on said frame at said cutting station,
    (c) means including a flywheel connecting to said shaft to effect rotation thereof,
    (d) said cutting station including a reciprocating cutting assembly, and a cooperating fixed anvil assembly, said cutter assembly including a cutting punch and a cooperating die to sever the wire stock on an oblique angle,
    (e) means for intermittently feeding a continuous strip of wire material to said cutting station whereby the end portion thereof is interposed between said anvil and said cutting assemblies,
    (f) said feeding means including cooperating feed rollers including a drive roller and a driven roller disposed in superposed rolling engagement therewith for feeding therebetween said wire stock, said rollers having complementary circumscribing grooves formed therein, and the lower of said superposed rollers having its circumscribing groove scored to effect a scoring on said wire stock driven thereby along the under surface of said stock to facilitate bending, and
    (g) means for effecting the drive of said drive feed roller.

2. The invention as defined in claim 1 and including,
    (a) means for imparting an opposed twist to the opposed bent end portions of said hog ring.

3. An apparatus for automatically forming a hog ring from a continuous strand of wire stock comprising,
    (a) a mounting block,
    (b) a drive shaft rotatably journalled on said mounting block,
    (c) a cam eccentrically mounted thereon,
    (d) a connecting arm journalled on said cam whereby rotation of said drive shaft effects reciprocation of said arm,
    (e) a ram connected to said arm and mounted on said mount to reciprocate therewith,
    (f) means for effecting rotation of said drive shaft,
    (g) a pair of spaced cutting punches carried by said ram, one of said punches being triangular in cross-section,
    (h) a cutting die operatively associated with one of said cutting punches, and said cutting die having a V-shaped notch for accommodating said one triangular punch to sever the wire stock on an oblique angle,
    (i) means for feeding said wire stock between said die and said one cutting punch,
    (j) an anvil disposed between said cutting punches,
    (k) a kicker means disposed on either side of said anvil to bend the ends of the severed wire,
    (l) said kicker means being constructed to impart a slight twist to the ends of said severed wire as the said is bent about said anvil,
    (m) and means for ejecting the formed hog ring off said anvil.

4. An apparatus for automatically forming a hog ring from a continuous wire stock comprising,
    (a) a frame,
    (b) a mounting block located on said frame, (c) a drive shaft rotatably journalled on said mounting block,
(d) said mounting block having a guide way formed thereon,
(e) said drive shaft having a cam eccentrically mounted thereon,
(f) a connecting arm journalled on said cam whereby rotation of said drive shaft effects reciprocation of said arm,
(g) a ram connected to said arm to reciprocate therewith, said ram being disposed in said guide way,
(h) means for effecting rotation of said drive shaft,
(i) a pair of spaced cutting punches carried by said ram,
(j) a cutting die operatively associated with one of said cutting punches,
(k) said one of said punches being triangular in cross-section,
(l) and said cutting die having a V-shaped notch formed in the end thereof for accommodating said one cutting punch to sever the wire stock on an oblique angle,
(m) means for feeding said wire stock between said one cutting punch and cooperating die,
(n) an anvil having a slightly rounded top and diverging side walls disposed between said pair of cutting punches,
(o) a kicker means disposed on either side of said anvil to bend the ends of the severed wire,
(p) said kicker means being constructed to impart a slight twist to the ends of said severed wire as the severed end of the wire is bent about said anvil,
(q) and means for ejecting the formed hog ring off said anvil.

5. An apparatus for automatically forming a hog ring from a continuous strand of wire stock comprising,
(a) a frame,
(b) a mounting block located on said frame,
(c) a drive shaft rotatably journalled on said mounting block,
(d) said mounting block having a guide way formed thereon,
(e) said drive shaft having a cam eccentrically mounted thereon,
(f) a connecting arm, rotatably journalled to said cam whereby rotation of said shaft effects reciprocation of said arm,
(g) a ram connected to said arm to reciprocate therewith, said ram being disposed in said guide way,
(h) means for effecting rotation of said drive shaft,
(i) a pair of spaced cutting punches carried by said ram,
(j) a cutting die operatively associated with one of said cutting punches,
(k) said one of said punches being triangular in cross-section,
(l) and said cutting die having a cooperating V-shaped notch for accommodating said one cutter to sever the wire stock on an angle,
(m) means for feeding said wire stock between said die and cutter,
(n) an anvil having diverging side walls disposed between said cutter punches,
(o) a kicker means disposed on either side of said anvil to reciprocate toward and away from said anvil to bend the ends of the severed wire,
(p) opposed lobe cam connected to said drive shaft for operating on said kicker means to effect operation thereof,
(q) said kicker means being constructed to impart a slight twist to the bent ends of said severed wire as the said wire is formed about said anvil,
(r) and means for ejecting the formed hog ring off said anvil.

6. An apparatus for automatically forming a hog ring from a continuous strand of wire stock material comprising,
(a) a mount having a pair of opposed guide ways formed thereon,
(b) a drive shaft rotatably journalled on said mount,
(c) an eccentric cam formed integral with said shaft,
(d) a connecting arm journalled on said cam whereby rotation of said shaft and connected cam effect reciprocation of said arm,
(e) a cutter assembly,
(f) said cutter assembly including ram slidably mounted in guide ways, said ram being connected to said actuating arms,
(g) a pair of spaced cutting punches fixed to said ram to reciprocate therewith,
(h) a resiliently urged hold-down pin disposed between said cutter punches and carried by said ram,
(i) an anvil disposed between said punches and in alignment with said hold-down pin,
(j) means for feeding wire stock so that the end portion thereof is disposed between said anvil and said cutter assembly,
(k) kicker means disposed on either side of said anvil,
(l) each of said kicker means including a reciprocating kicker anvil, and a connected kicker arm pivotally mounted to said mount about a pivot intermediate the ends thereof,
(m) a pair of cooperating lobes connected to said drive shaft,
(n) said pair of lobes each acting on one of said kicker arms to effect simultaneous movement of the connected kicker toward and away from one another,
(o) an ejector means,
(p) said ejector means including a member slidably connected over said anvil,
(q) means for reciprocating said ejector slide,
(r) said latter means including grooved cam connected to said drive shaft,
(s) and a cam follower connected to said ejector slide and adapted to ride in said cam groove to effect reciprocation thereof as said drive shaft is rotated.

7. An apparatus for automatically forming a hog ring from a continuous strand of wire stock material comprising,
(a) a mount having a pair of opposed guide ways formed thereon,
(b) a drive shaft rotatably journalled on said mount,
(c) an eccentric cam formed integral with said shaft,
(d) a connecting arm journalled on said cam whereby rotation of said shaft and connected cam effect reciprocation of said arm,
(e) a cutter assembly,
(f) said cutter asembly including ram slidably mounted in guide-ways, said ram being connected to said actuating arm to reciprocate therewith,
(g) a pair of spaced cutting punches fixed to said ram to reciprocate therewith,
(h) a resiliently urged hold-down pin disposed between said cutter punches and carried by said ram,
(i) an anvil disposed between said punches and in alignment with said hold-down pin,
(j) means for feeding wire stock so that the end portion thereof is disposed between said anvil and said cutter assembly,
(k) kicker means disposed on either side of said anvil,
(l) each of said kicker means including a reciprocating kicker adapted to move toward and away from the sides of said anvil, and a connecting kicker arm pivotally mounted to said mount about a pivot intermediate the ends thereof,
(m) a pair of cooperating lobes connected to said drive shaft, (n) said pair of lobes each acting on said kicker arms to effect simultaneous movement of said connected kicker toward and away from one another,
(o) means formed on said kickers to impart an opposite twist to the bent ends of said hog ring,
(p) an ejector means,
(q) said ejector means including a member slidably connected over said anvil,
(r) means for reciprocating said ejector slide,
(s) said latter means including grooved cam connected to said drive shaft,
(t) and a cam follower connected to said ejector slide and adapted to ride in said cam groove to effect reciprocation thereof as said drive shaft is rotated.

References Cited

UNITED STATES PATENTS

| | | | |
|---|---|---|---|
| 253,390 | 2/1882 | Johnston | 59—23 |
| 310,577 | 1/1885 | Gilmore | 140—88 |
| 2,712,835 | 7/1955 | Sampatacos | 59—23 |
| 3,213,898 | 10/1965 | Le Grady | 140—112 |

FOREIGN PATENTS

| | | |
|---|---|---|
| 445,969 | 9/1912 | France. |
| 301,707 | 12/1928 | Great Britain. |

CHARLES W. LANHAM, *Primary Examiner.*

G. P. CROSBY, *Assistant Examiner.*